United States Patent
Matsumoto et al.

(10) Patent No.: US 9,350,043 B2
(45) Date of Patent: *May 24, 2016

(54) NONAQUEOUS ELECTROLYTE SECONDARY BATTERY

(75) Inventors: Hiroyuki Matsumoto, Kobe (JP); Takeshi Ogasawara, Kobe (JP); Naoki Imachi, Kobe (JP)

(73) Assignee: SANYO Electric Co., Ltd., Osaka (JP)

( * ) Notice: Subject to any disclaimer, the term of this patent is extended or adjusted under 35 U.S.C. 154(b) by 751 days.

This patent is subject to a terminal disclaimer.

(21) Appl. No.: 12/892,066

(22) Filed: Sep. 28, 2010

(65) Prior Publication Data

US 2011/0076571 A1    Mar. 31, 2011

(30) Foreign Application Priority Data

Sep. 28, 2009 (JP) ................................ 2009-222973

(51) Int. Cl.
| | | |
|---|---|---|
| *H01M 10/05* | (2010.01) | |
| *H01M 4/13* | (2010.01) | |
| *H01M 4/139* | (2010.01) | |
| *H01M 10/0569* | (2010.01) | |
| *H01M 4/02* | (2006.01) | |

(Continued)

(52) U.S. Cl.
CPC .............. *H01M 10/05* (2013.01); *H01M 4/13* (2013.01); *H01M 4/139* (2013.01); *H01M 4/366* (2013.01); *H01M 10/0569* (2013.01); *H01M 4/02* (2013.01); *H01M 10/052* (2013.01); *H01M 2004/021* (2013.01); *H01M 2300/0025* (2013.01); *H01M 2300/0037* (2013.01); *Y02E 60/122* (2013.01)

(58) Field of Classification Search
CPC ....... H01M 10/05; H01M 4/13; H01M 4/139; H01M 4/02; H01M 4/366; H01M 10/052; H01M 10/0569

See application file for complete search history.

(56) References Cited

U.S. PATENT DOCUMENTS

2001/0026891 A1* 10/2001 Dansui et al. ................. 429/223
2002/0037455 A1*  3/2002 Tani ........................ H01M 4/30
                                                                        429/223

(Continued)

FOREIGN PATENT DOCUMENTS

JP         2005-196992     *  7/2005    ............. H01M 4/58
JP         2005-196992 A      7/2005

(Continued)

OTHER PUBLICATIONS

Office Action dated Nov. 25, 2013, issued in corresponding Chinese Application No. 201010289838.9 with English translation (10 pages).

(Continued)

*Primary Examiner* — Barbara Gilliam
*Assistant Examiner* — Angela Martin
(74) *Attorney, Agent, or Firm* — Westerman, Hattori, Daniels & Adrian, LLP

(57) ABSTRACT

A nonaqueous electrolyte secondary battery is prevented from decreasing the remaining capacity and returned capacity at the time of continuous charge at high voltages and high temperatures. The battery has positive and negative electrodes, and a nonaqueous electrolytic solution containing ethylene carbonate and fluoroethylene carbonate as a solvent. The positive electrode contains a positive-electrode active material with the fine particles of a rare earth element compound deposited on its surface in a dispersed state.

11 Claims, 4 Drawing Sheets

(51) Int. Cl.
*H01M 10/052* (2010.01)
*H01M 4/36* (2006.01)

(56) References Cited

U.S. PATENT DOCUMENTS

| | | | |
|---|---|---|---|
| 2004/0191633 A1* | 9/2004 | Johnson et al. | 429/246 |
| 2005/0031963 A1 | 2/2005 | Im et al. | |
| 2006/0177739 A1* | 8/2006 | Endo et al. | 429/231.95 |
| 2007/0037063 A1* | 2/2007 | Choi et al. | 429/330 |
| 2007/0292757 A1* | 12/2007 | Watanabe et al. | 429/220 |
| 2008/0160415 A1 | 7/2008 | Wakita et al. | |
| 2008/0311481 A1* | 12/2008 | Kim et al. | 429/342 |
| 2008/0318131 A1* | 12/2008 | Watanabe et al. | 429/231.95 |
| 2009/0004097 A1* | 1/2009 | Jung et al. | 423/594.4 |
| 2009/0123851 A1 | 5/2009 | Soma et al. | |
| 2011/0050178 A1* | 3/2011 | Kim et al. | 320/137 |
| 2012/0189891 A1* | 7/2012 | Ooyama et al. | 429/94 |
| 2014/0272582 A1* | 9/2014 | Ogasawara et al. | 429/218.1 |

FOREIGN PATENT DOCUMENTS

| | | | | |
|---|---|---|---|---|
| JP | 2007-504628 A | | 3/2007 | |
| JP | 2007-128765 A | | 5/2007 | |
| JP | 2007-305546 | * | 11/2007 | H01M 4/02 |
| JP | 2007-305546 A | | 11/2007 | |
| JP | 2009-123464 A | | 6/2009 | |
| WO | 2005/024991 A1 | | 3/2005 | |
| WO | WO 2005/024991 | * | 3/2005 | H01M 10/40 |
| WO | WO 2008/082048 | * | 7/2008 | H01M 10/40 |

OTHER PUBLICATIONS

Japanese Office Action dated Jul. 2, 2013, issued in corresponding Japanese Patent Application No. 2009-222973 (3 pages).

* cited by examiner

NONAQUEOUS ELECTROLYTE SECONDARY BATTERY

BACKGROUND OF THE INVENTION

1. Field of the Invention

The present invention relates to nonaqueous electrolyte secondary batteries, and more particularly relates to a nonaqueous electrolyte secondary batteries with excellent continuous charge characteristics.

2. Description of Related Art

Portable information terminals such as mobile phones, notebook personal computers, and PDAs are becoming increasingly smaller and lighter in recent years. In line with this trend, secondary batteries used as power sources for driving them are required to have higher capacities.

The present most widely used nonaqueous electrolyte secondary batteries have a positive-electrode active material composed of a lithium-containing transition metal oxide and a negative-electrode active material composed of a graphite-based carbon material. Lithium-containing transition metal oxides are favorable to provide smaller and lighter batteries. Most of these nonaqueous electrolyte secondary batteries have a nonaqueous electrolytic solution containing a lithium salt such as $LiPF_6$ dissolved in a solvent mixture of a cyclic carbonate ester and a chain carbonate ester. Examples of the cyclic carbonate ester include ethylene carbonate (EC), and examples of the chain carbonate ester include diethyl carbonate (DEC), ethyl methyl carbonate (EMC), and dimethyl carbonate (DMC).

These batteries are required to have higher charge voltages to increase their capacities and energy densities; however, a higher charge voltage causes oxidative decomposition of the electrolytic solution at the positive electrode or degradation of the positive electrode.

In order to solve these problems, several attempts have been made including using a highly oxidation-resistant electrolytic solution or coating the surface of the positive electrode.

Japanese Patent Laid-open of PCT Application No. 2007-504628 uses an electrolytic solution containing fluoroethylene carbonate (FEC), which is obtained by replacing some of the hydrogen atoms of ethylene carbonate by fluorine. This document states that the use of FEC can form a thermally stable film at the negative electrode, thereby improving the thermal stability of the battery.

Japanese Patent Laid-open No. 2007-305546 discloses a technique to improve battery characteristics such as cycle characteristics by coating zirconia or other inorganic oxides on the surface of the positive electrode.

Japanese Patent Laid-open No. 2005-196992 proposes using a positive-electrode active material composed of a layered composite oxide containing Li, Ni, Mn, Co, and at least one rare earth element.

In spite of these attempts, however, the batteries decrease in remaining capacity and returned capacity when subjected to continuous charge at high voltages and high temperatures.

SUMMARY OF THE INVENTION

The present invention has an object of providing a nonaqueous electrolyte secondary battery which is prevented from decreasing the remaining capacity and returned capacity, and from increasing the growth rate of charge capacity at the time of continuous charge at high voltages and high temperatures.

The present invention is directed to provide a nonaqueous electrolyte secondary battery having a positive electrode, a negative electrode, and a nonaqueous electrolytic solution. The nonaqueous electrolytic solution contains fluoroethylene carbonate as a solvent, and the positive electrode contains a positive-electrode active material with the fine particles of a rare earth element compound deposited on its surface in a dispersed state.

The nonaqueous electrolyte secondary battery of the present invention uses a positive-electrode active material with the fine particles of a rare earth element compound deposited on its surface in a dispersed state and a nonaqueous electrolytic solution containing fluoroethylene carbonate as a solvent. As a result, the battery is prevented from decreasing the remaining capacity and returned capacity and from increasing the growth rate of charge capacity at the time of continuous charge at high voltages and high temperatures.

In the nonaqueous electrolyte secondary battery of the present invention, the positive-electrode active material has the fine particles of a rare earth element compound deposited on its surface in a dispersed state. The fine particles of the rare earth element compound have an average particle size of preferably 100 nm or less, and more preferably 1 to 100 nm, and further more preferably 10 to 100 nm. When the average particle size of a rare earth element compound exceeds 100 nm, the number of the fine particles deposited per unit area of the positive-electrode active material may be too small to obtain the full effect by the rare earth element compound of preventing the electrolytic solution from being decomposed.

The nonaqueous electrolytic solution used in the present invention preferably also contains ethylene carbonate as a solvent.

In the nonaqueous electrolytic solution used in the present invention, the volume ratio of the fluoroethylene carbonate (FEC) to the sum of the ethylene carbonate (EC) and the fluoroethylene carbonate (FEC) preferably satisfies the relation of $0.2 \leq FEC/(EC+FEC)$. This relation prevents an increase in the growth rate of charge capacity and a decrease in the charge-discharge efficiency after the continuous charge and storage test.

The positive-electrode active material with the fine particles of a rare earth element compound deposited on its surface in a dispersed state can be prepared by a method including a process of precipitating a hydroxide of the rare earth element on the surface of a positive-electrode active material dispersed in a solution. After having the hydroxide of the rare earth element deposited on its surface, the positive-electrode active material is subjected to drying and a heat treatment. After the heat treatment, the hydroxide deposited on the surface is present in the form of a hydroxide, an oxyhydroxide, an oxide, or the like. Thus, the positive-electrode active material used in the present invention has the rare earth element compound deposited on its surface in the form of a hydroxide, an oxyhydroxide, an oxide, or the like.

The heat treatment is performed preferably at 80 to 600° C., and more preferably 80 to 400° C. When the temperature exceeds 600° C., some of the fine particles of the rare earth compound deposited on the surface disperse into the active material, thereby decreasing the initial charge-discharge efficiency. Therefore, in order to obtain a high-capacity active material with a rare earth compound deposited on its surface as selectively as possible, the preferable temperature of the heat treatment is 600° C. or less. After the heat treatment, the hydroxide deposited on the surface is present in the form of a hydroxide, an oxyhydroxide, an oxide, or the like. Thus, the positive-electrode active material used in the present invention has the rare earth element compound deposited on its surface in the form of a hydroxide, an oxyhydroxide, an oxide, or the like. When the heat treatment is performed 400° C. or less, the rare earth element compound is mostly in the form of a hydroxide or an oxyhydroxide. The heat treatment time is preferably 3 to 7 hours.

The hydroxide of the rare earth element can be precipitated as follows. A water-soluble salt such as nitrate or sulfate of the rare earth element is dissolved in a suspension of a positive-electrode active material. Then, an alkaline aqueous solution such as a sodium hydroxide aqueous solution or a potassium hydroxide aqueous solution is added thereto so as to adjust the pH in the range of 6 to 13.

The amount of deposition of the rare earth element compound in the positive-electrode active material used in the present invention is preferably in the range of 0.005 to 0.5% by mass, and more preferably in the range of 0.01 to 0.3% by mass. Too small an amount of deposition of the rare earth element may cause a larger decrease in the discharge characteristics after continuous charge than the case where the amount is in the preferable range. Too large an amount of deposition of the rare earth element may also cause a larger decrease in the discharge characteristics because the surface of the active material is coated with too many fine particles of the rare earth compound that do not contribute to charge-discharge reactions.

The amount of deposition of the rare earth element compound is relative to the positive-electrode active material. When the amount of deposition is 0.1% by mass, this means that 0.1 parts by mass of the rare earth element compound is deposited on 100 parts by mass of the positive-electrode active material with no rare earth element compound deposited thereon. The amount of deposition of the rare earth element compound is expressed as a value in terms of rare earth element.

Examples of the rare earth element of the rare earth element compound used in the present invention include erbium, samarium, praseodymium neodymium, ytterbium, terbium, dysprosium, holmium, thulium, and lutetium.

Examples of the positive-electrode active material used in the present invention include lithium-containing transition metal composite oxides containing a transition metal such as cobalt, nickel, or manganese. Examples of the lithium-containing transition metal composite oxides include a lithium cobalt oxide, a lithium-cobalt-nickel-manganese composite oxide, a lithium-nickel-manganese-aluminum composite oxide, and a lithium-nickel-cobalt-aluminum composite oxide. These positive-electrode active materials may be used alone or in combination.

The negative-electrode active material used in the present invention can be anything as long as it can be used as a negative-electrode active material in nonaqueous electrolyte secondary batteries. Examples of the negative-electrode active material include carbon materials such as graphite and coke, a tin oxide, metallic lithium, metals which can form an alloy with lithium such as silicon, and alloys thereof.

The nonaqueous electrolytic solution used in the present invention can be anything as long as it can be used in nonaqueous electrolyte secondary batteries. Such a nonaqueous electrolytic solution generally contains a supporting electrolyte and a solvent.

Examples of the supporting electrolyte include $LiBF_4$, $LiPF_6$, $LiN(SO_2CF_3)_2$, $LiN(SO_2C_2F_5)_2$, and $LiPF_{6-x}(C_nF_{2n+1})_x$ where $1<x<6$, and $n=1$ or 2. These materials can be used alone or in combination of two or more thereof. The concentration of the supporting electrolyte is not particularly limited, but is preferably 0.8 to 1.5 mol/L.

The nonaqueous electrolytic solution used in the present invention contains fluoroethylene carbonate (FEC) and preferably also contains ethylene carbonate (EC) as a solvent. As the ratio of the FEC to the sum of the EC and FEC becomes larger, the thickness of the battery increases, but the growth rate of charge capacity after the continuous charge test can be reduced as will be described later. When FEC/(EC+FEC) is not less than 0.2, the charge-discharge cycle efficiency after storage can be high as will be described later.

The solvent is preferably a combination of cyclic carbonate and chain carbonate. The EC and FEC, which are cyclic carbonate, are preferably used in combination combined with chain carbonate such as diethyl carbonate (DEC), ethyl methyl carbonate (EMC), or dimethyl carbonate (DMC). It is possible to additionally use propylene carbonate (PC), γ-butyrolactone (GBL), or the like as cyclic carbonate.

It is also possible to additionally use carbonate obtained by replacing some of the hydrogen atoms of the solvent by fluorine.

The ratio of the EC and FEC to the entire volume of the solvent preferably satisfies the relation of 0<(EC+FEC)/the entire volume of the solvent<0.6, and more preferably, the relation of 0.2<(EC+FEC)/the entire volume of the solvent<0.5. The EC and FEC have high dielectric constants because of being cyclic carbonate. Therefore, when the ratio of the EC+FEC to the entire volume of the solvent is too high, this may increase the viscosity of the electrolytic solution, possibly decreasing the battery characteristics.

Effect of the Invention

The nonaqueous electrolyte secondary battery of the present invention is prevented from decreasing the remaining capacity and returned capacity at the time of continuous charge at high voltages and high temperatures.

DETAILED DESCRIPTION OF THE PREFERRED EXAMPLES

Figure 1:
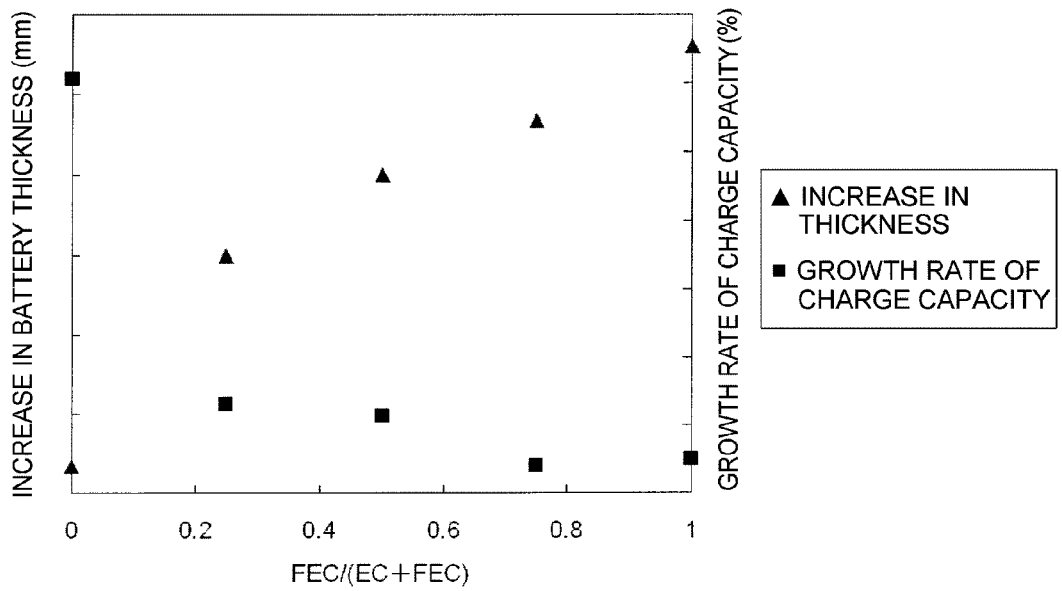
FIG. 1 shows the relation between the FEC ratio, the battery thickness, and the growth rate of charge capacity in some examples of the present invention.

Specific examples of the present invention will be described as follows, but the present invention is not limited to these examples, and can be implemented in various forms within its scope.

Experiment 1

Example 1

Batteries of Example 1 were manufactured as follows.

[Synthesis of the Positive-Electrode Active Material]

Lithium cobalt oxide was prepared containing 1.5 mol % of Mg and 1.5 mol % Al as a solid solution, and 0.05 mol % of Zr. The lithium cobalt oxide was obtained by mixing $Li_2CO_3$, $CO_3O_4$, MgO, $Al_2O_3$, and $ZrO_2$ and heating the mixture for 24 hours at 850° C. in air atmosphere. Then, 1000 g of the lithium cobalt oxide was added to 3 liters of pure water and stirred to prepare a suspension of the lithium cobalt oxide. Then, a solution dissolved with 1.78 g of erbium nitrate pentahydrate was added to the suspension. Together with this solution, 10% by mass of aqueous sodium hydroxide was added to the suspension so as to maintain the solution containing lithium cobalt oxide at pH 9. The obtained mixture was suction filtered, washed with water, and the resulting powder was dried at 120° C. As a result, the lithium cobalt oxide had erbium hydroxide uniformly deposited on its surface.

The lithium cobalt oxide with erbium hydroxide deposited thereon was heated at 300° C. for 5 hours in the air, thus obtaining the positive-electrode active material. The obtained positive-electrode active material was observed with a scanning electron microscope (SEM) to find that the active material had erbium compound having an average particle size of 100 nm or less deposited on its surface in a uniformly dispersed state. The amount of deposition of the erbium compound in the lithium cobalt oxide was 0.067% by mass in terms of erbium element when it was measured by ICP analysis.

[Preparation of the Positive Electrode]

A slurry was prepared by mixing the positive-electrode active material, acetylene black as a conductive agent, and an N-methyl-2-pyrrolidone solution having polyvinylidene fluoride dissolved therein as a binder. The positive-electrode active material, the conductive agent, and the polyvinylidene fluoride were mixed in a mass ratio of 95:2.5:2.5.

The slurry was applied to both sides of an aluminum foil, dried and rolled such that the packing density was 3.6 $g/cm^3$. Thus, the positive electrode was completed.

[Preparation of the Negative Electrode]

A slurry was prepared by mixing a carbon material (graphite), CMC (carboxymethylcellulose sodium), and SBR (styrene-butadiene rubber) in a mass ratio of 98:1:1 in an aqueous solution.

The slurry was applied to both sides of a copper foil, dried, and rolled to complete a negative electrode. The negative-electrode active material had a packing density of 1.7 $g/cm^3$.

[Preparation of the Nonaqueous Electrolytic Solution]

First, two electrolytic solutions: a first electrolytic solution and a second electrolytic solution were prepared as follows. The first electrolytic solution was prepared by mixing EC and EMC in a volume ratio of 3:7, dissolving $LiPF_6$ in the mixture at a concentration of 1 mol/L, and adding 1% by mass of vinylene carbonate thereto. The second electrolytic solution was prepared by mixing FEC and EMC in a volume ratio of 3:7, dissolving $LiPF_6$ in the mixture solvent at a concentration of 1 mol/L, and adding 1% by mass of vinylene carbonate thereto.

The first and second electrolytic solutions thus prepared were mixed such that the EC and the FEC were in a volume ratio of 90:10, thereby being used as the nonaqueous electrolytic solution.

[Assembly of the Battery]

Lead terminals were connected to the positive and negative electrodes thus prepared. Then, a separator was disposed between these electrodes, wound together into a spiral, and pressed flat to form an electrode assembly 3.

Figure 4:
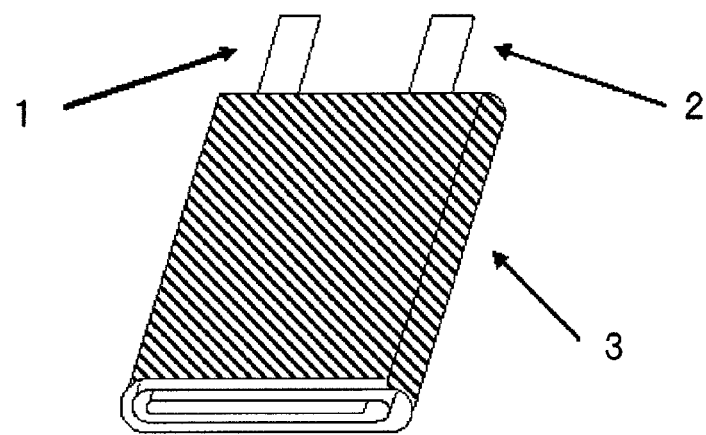
FIG. 4 is a perspective view of an electrode assembly manufactured in each example of the present invention.

FIG. 4 is a perspective view of the electrode assembly 3. As shown in FIG. 4, the electrode assembly 3 is in a spiral form, and the positive and negative electrodes have a positive electrode collector tab 1 and a negative electrode collector tab 2, respectively.

The electrode assembly 3 was housed in an outer body made of aluminum laminate, thereby completing a battery.

Figure 5:
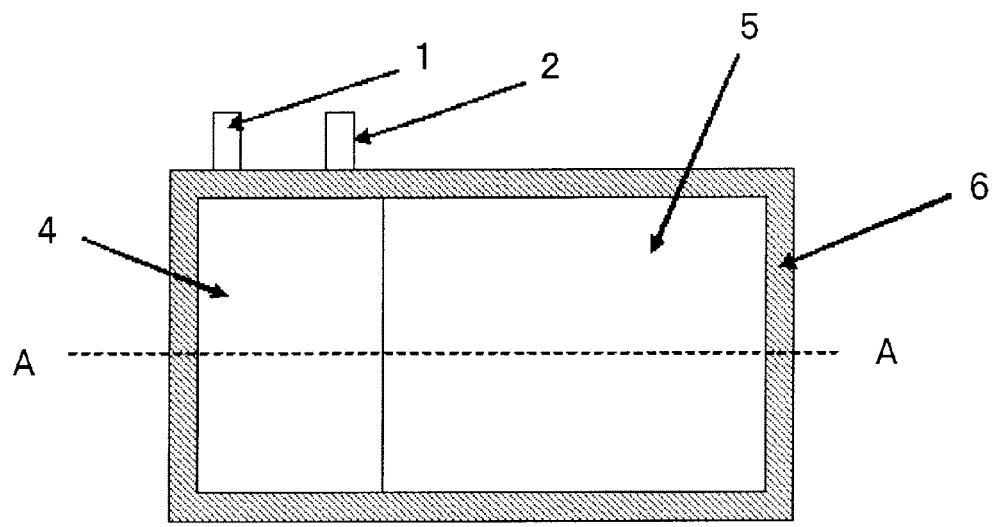
FIG. 5 is a plan view of a lithium-ion secondary battery manufactured in each example of the present invention.
Figure 6:
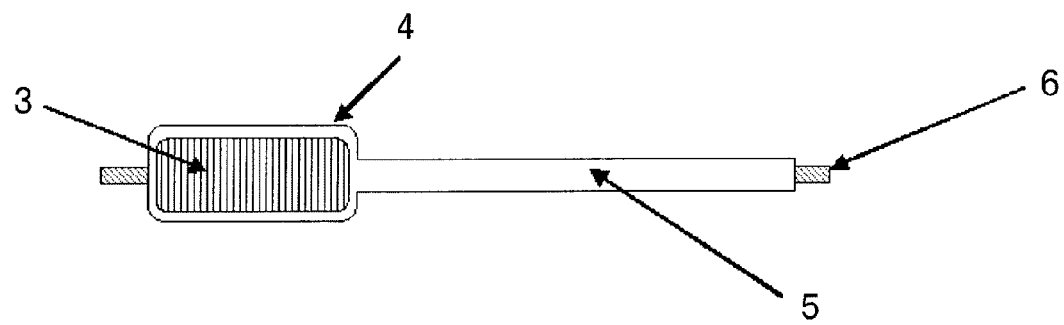
FIG. 6 is a cross-sectional view taken along the line A-A of FIG. 5.

FIG. 5 is a plan view of the completed battery. FIG. 6 is a cross-sectional view taken along the line A-A of FIG. 5.

As shown in FIGS. 5 and 6, the outer body made of aluminum laminate includes an electrode assembly area 4 in which the electrode assembly 3 is placed, and a spare area 5 for collecting the gas generated in the electrode assembly 3. The electrode assembly area 4 and the spare area 5 are communicated inside with each other inside.

Three sides of the outer body were heat-sealed along a heat-sealing area 6, and the electrode assembly 3 was inserted into the electrode assembly area 4 in a $CO_2$ atmosphere under the conditions of 25° C. and 1 atm. Then, the remaining one side of the heat-sealing area 6 was heat-sealed.

The electrode assembly area 4 having dimensions of 4 mm (thickness)×34 mm×54 mm was sandwiched between plates and constantly subjected to a construction pressure. The spare area 5 had dimensions of 54 mm×50 mm. As described above, the gas generated in the electrode assembly area 4 moves to the spare area 5, preventing the electrode assembly 3 from being filled with the gas and from increasing electric resistance. Consequently, there is no decrease in the charge-discharge characteristics.

The completed battery had a design capacity of 750 mAh at an end-of-charge voltage of 4.4V.

Example 2

Batteries of Example 2 were manufactured in the same manner as in Example 1 except that the volume ratio of EC to FEC in the nonaqueous electrolytic solution was 80:20.

Example 3

Batteries of Example 3 were manufactured in the same manner as in Example 1 except that the volume ratio of EC to FEC in the nonaqueous electrolytic solution was 75:25.

Example 4

Batteries of Example 4 were manufactured in the same manner as in Example 1 except that the volume ratio of EC to FEC in the nonaqueous electrolytic solution was 50:50.

Example 5

Batteries of Example 5 were manufactured in the same manner as in Example 1 except that the volume ratio of EC to FEC in the nonaqueous electrolytic solution was 25:75.

Example 6

Batteries of Example 6 were manufactured in the same manner as in Example 1 except that the volume ratio of EC to FEC in the nonaqueous electrolytic solution was 0:100. In other words, this electrolytic solution consists of only the second nonaqueous electrolytic solution.

Comparative Example 1

Batteries of Comparative Example 1 were manufactured in the same manner as in Example 1 except that the volume ratio of EC to FEC in the nonaqueous electrolytic solution was 100:0. In other words, this electrolytic solution consists of only the first nonaqueous electrolytic solution.

Comparative Example 2

Batteries of Comparative Example 2 were manufactured in the same manner as in Example 1 except that the positive-electrode active material treated with 1.96 g of zirconium oxynitrate dihydrate instead of the erbium nitrate pentahydrate used in Example 1 and that the volume ratio of EC to FEC in the nonaqueous electrolytic solution was 100:0. The positive-electrode active material in this Comparative Example has a zirconium compound deposited on its surface. SEM observation indicates that the positive-electrode active material has a zirconium compound having an average particle size 100 nm or less deposited on its surface in a uniformly dispersed state in the same manner as in the positive-electrode active material of Example 1. The amount of deposition of the zirconium compound in the lithium cobalt oxide was 0.067% by mass in terms of zirconium element.

Comparative Example 3

Batteries of Comparative Example 3 were manufactured in the same manner as in Comparative Example 2 except that the volume ratio of EC to FEC in the nonaqueous electrolytic solution was 75:25.

Comparative Example 4

Batteries of Comparative Example 4 were manufactured in the same manner as in Comparative Example 2 except that the volume ratio of EC to FEC in the nonaqueous electrolytic solution was 50:50.

Comparative Example 5

Batteries of Comparative Example 5 were manufactured in the same manner as in Comparative Example 2 except that the volume ratio of EC to FEC in the nonaqueous electrolytic solution was 25:75.

Comparative Example 6

Batteries of Comparative Example 6 were manufactured in the same manner as in Comparative Example 2 except that the volume ratio of EC to FEC in the nonaqueous electrolytic solution was 0:100.

Comparative Example 7

Batteries of Comparative Example 7 were manufactured in the same manner as in Example 1 except that the positive-electrode active material was obtained using lithium cobalt oxide with no deposition of erbium hydroxide, and that the volume ratio of EC to FEC in the nonaqueous electrolytic solution was 100:0.

Comparative Example 8

Batteries of Comparative Example 8 were manufactured in the same manner as in Example 1 except that the positive-electrode active material was obtained using lithium cobalt oxide with no deposition of erbium hydroxide, and that the volume ratio of EC to FEC in the nonaqueous electrolytic solution was 0:100.

<Observation with a Scanning Electron Microscope (SEM)>

Figure 7:
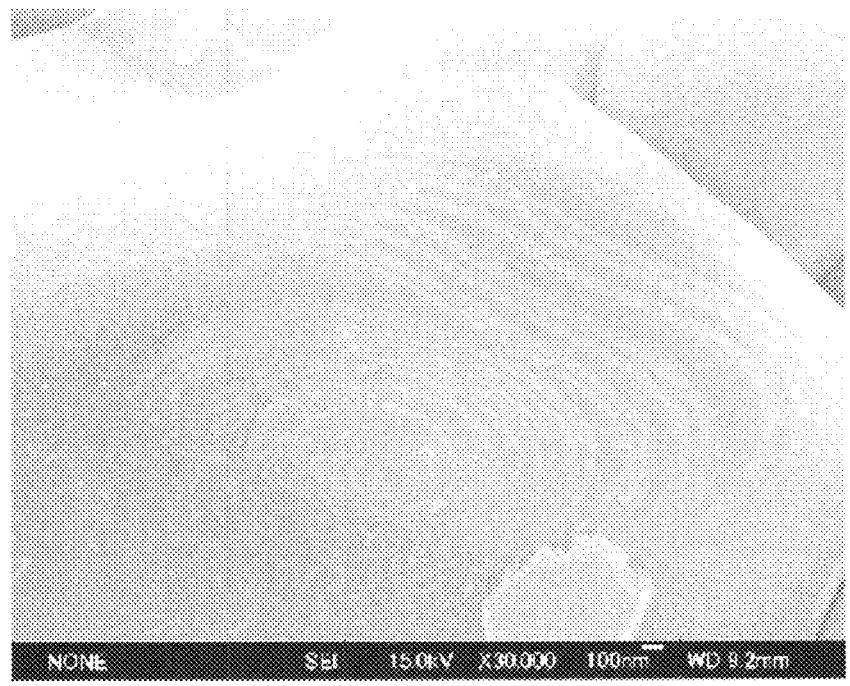
FIG. 7 is a scanning electron micrograph (at 30000-fold magnification) of the surface of a positive-electrode active material prepared in Example 1 of the present invention.
Figure 8:
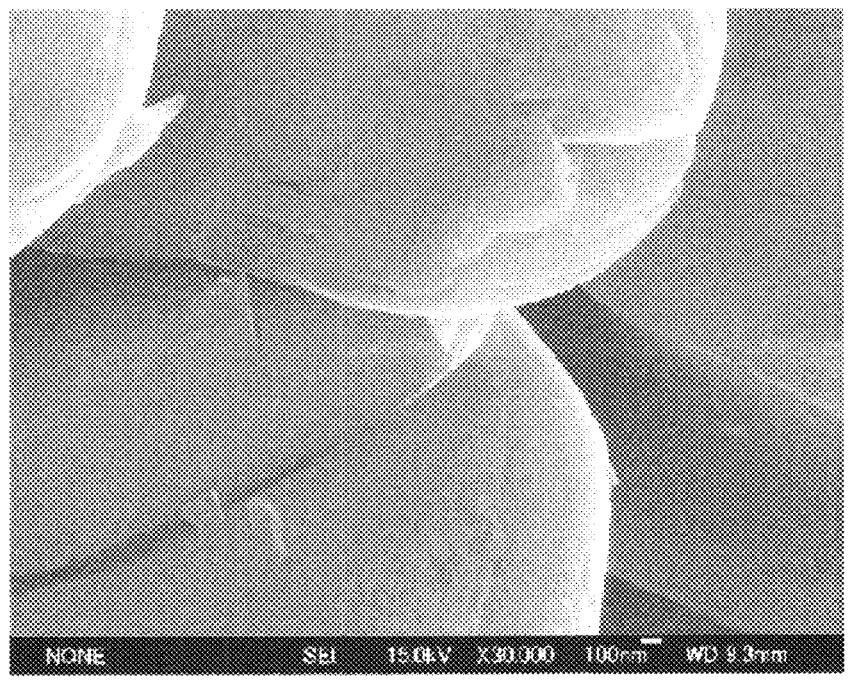
FIG. 8 is a scanning electron micrograph (at 30000-fold magnification) of the surface of a positive-electrode active material having no rare earth element compound deposited thereon.

FIG. 7 is an SEM image of the surface of the positive-electrode active material prepared in Example 1. FIG. 8 is an SEM image of the surface of the lithium cobalt oxide with no deposition of erbium hydroxide in Example 1 (the positive-electrode active material used in Comparative Example 7 and 8).

As shown in FIG. 7, the positive-electrode active material of Example 1 had fine particles of an average particle size of 100 nm or less deposited on its surface in a uniformly dispersed state.

As shown in FIG. 8, no fine particles such as shown in FIG. 7 were observed in the positive-electrode active material with no deposition of a rare earth element compound deposited on its surface.

<Evaluation of the Batteries>

The batteries manufactured in the above-described Examples and Comparative Examples were subjected a charge-discharge cycle test under the following charge-discharge conditions in the measurement of the initial charge-discharge capacity and in a continuous charge test at 60° C.

Charging: the batteries were charged at a constant current of 1 It (750 mA) until the voltage reached 4.4V, and then at a constant voltage of 4.4V until the current reached 37.5 mA.

Discharging: the batteries were discharged at a constant current of 1 It (750 mA) until the voltage reached 2.75V.

Pause: A ten-minute pause was inserted between charge and discharge.

[Measurement of the Initial Charge and Discharge Capacities]

A first charge-discharge cycle was performed under the above-described conditions, thereby measuring the initial charge and discharge capacities.

[Continuous Charge Test at 60° C.]

A first charge-discharge cycle was performed under the above-described conditions to confirm that the same initial charge and discharge capacities as above were obtained. Then, the batteries were left in a constant temperature bath at 60° C. for one hour. While still in a 60° C. environment, the batteries were charged at a constant current of 750 mA until the voltage reached 4.4V, and then further charged at a constant voltage of 4.4V for 60 hours.

An increase in the battery thickness caused by the continuous charge test was measured at the spare area 5. Then, the batteries were cooled to room temperature. At room temperature, the charge and discharge capacities at the first cycle and the discharge capacity at the second cycle after the continuous charge test were measured. Then, the capacity residual rate, the capacity return rate, and the growth rate of charge capacity were calculated based on the respective formulas below.

Capacity residual rate (%)={the discharge capacity at the first cycle after the continuous charge test/the discharge capacity before the continuous charge test}×100

Capacity return rate (%)={the discharge capacity at the second cycle after the continuous charge test/the discharge capacity before the continuous charge test}×100

The growth rate of charge capacity (%)={(the charge capacity before the continuous charge test+the charge capacity at the first cycle after the continuous charge test)/the charge capacity before the continuous charge test}×100

The capacity residual rate, the capacity return rate, the growth rate of charge capacity, and the increase in thickness in Examples 1 to 6 and Comparative Examples 1 to 8 are shown in Table 1 below.

TABLE 1

| | Rare earth element compound | FEC ratio | Capacity residual rate (%) | Capacity return rate (%) | Growth rate of charge capacity (%) | Increase in thickness (mm) |
|---|---|---|---|---|---|---|
| Comparative Example 1 | Erbium | 0 | 85.2 | 82.9 | 126.1 | 0.3 |
| Example 1 | Erbium | 0.1 | 87.6 | 87.6 | 125.7 | 2.0 |
| Example 2 | Erbium | 0.2 | 86.4 | 86.6 | 121.6 | 2.8 |
| Example 3 | Erbium | 0.25 | 87.7 | 84.3 | 116.6 | 3.0 |
| Example 4 | Erbium | 0.5 | 85.3 | 83.3 | 116.3 | 4.0 |
| Example 5 | Erbium | 0.75 | 84.9 | 82.8 | 114.8 | 4.7 |
| Example 6 | Erbium | 1.0 | 87.8 | 85.9 | 115.0 | 5.6 |
| Comparative Example 2 | Zirconium | 0 | 83.7 | 81.6 | 131.8 | 1.4 |
| Comparative Example 3 | Zirconium | 0.25 | 80.7 | 79.3 | 120.7 | 4.4 |
| Comparative Example 4 | Zirconium | 0.5 | 78.8 | 77.8 | 117.9 | 5.5 |
| Comparative Example 5 | Zirconium | 0.75 | 81.2 | 79.2 | 117.0 | 6.1 |
| Comparative Example 6 | Zirconium | 1 | 85.2 | 83.5 | 116.7 | 7.3 |
| Comparative Example 7 | — | 0 | 52.7 | 49.9 | 180.3 | 3.8 |
| Comparative Example 8 | — | 1 | 69.8 | 68.4 | 135.3 | 12.0 |

FIG. 1 shows the relation between the value of FEC/(EC+FEC), the battery thickness, and the growth rate of charge capacity in Examples 3 to 6 and Comparative Example 1.

Figure 2:
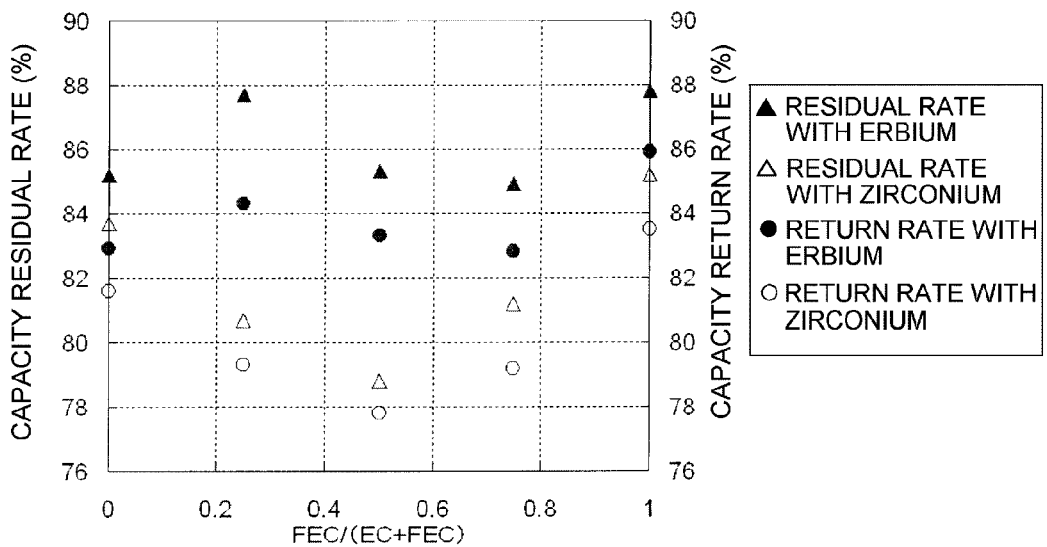
FIG. 2 shows the relation between the FEC ratio, the capacity residual rate, and the capacity return rate in the examples of the present invention.

FIG. 2 shows the relation between the value of FEC/(EC+FEC), the capacity residual rate, and the capacity return rate in Examples 3 to 6 and Comparative Examples 1 to 6. FIG. 2 does not show Examples 1 and 2 because these examples have no comparative example counterparts using zirconium.

Table 1 and FIG. 1 indicate that the growth rate of charge capacity decreases with increasing FEC ratio. The reason for this is that the increased FEC ratio reduces the reaction between the electrolytic solution and the electrodes.

As understood from Table 1 and FIG. 2, the remaining capacity (capacity residual rate and capacity return rate) is low when the positive-electrode active material with zirconium deposited thereon satisfies the relation of 0<FEC/(EC+FEC)≤0.5 (Comparative Examples 3 and 4). The reason for the low remaining capacity (capacity residual rate and capacity return rate) is considered as follows. Not only the EC causes a reaction and is decomposed at the positive electrode, but also the FEC is reductively decomposed at the negative electrode, and the reductive decomposition product moves to the positive electrode and causes a reaction there. The influence of these two side reactions makes the remaining capacity lower than in the case of using EC only (Comparative Example 2). When the relation of 0.5<FEC/(EC+FEC) is satisfied (Comparative Examples 5 and 6), the remaining capacity (capacity residual rate and capacity return rate) is high probably because of the following reason. Although the reductive decomposition product of the FEC at the negative electrode causes a reaction at the positive electrode, the EC ratio is small enough to prevent the positive electrode from being deteriorated by decomposition of the EC at the positive electrode. In short, the remaining capacity (capacity residual rate and capacity return rate) begins to increase when the relation of FEC/(EC+FEC)=0.5 is reached.

In the case of using the positive-electrode active material with erbium compound as a rare earth element deposited on its surface, on the other hand, the use of FEC and EC in mixture can reduce a decrease in the capacity residual rate and the capacity return rate. As shown in Table 1 and FIG. 2, in Examples 1 to 6, the capacity residual rate is about 86%, and the capacity return rate is about 84%.

Thus, using the positive-electrode active material with the fine particles of a rare earth element deposited on its surface can reduce both an increase in the growth rate of charge capacity and a decrease in the capacity residual rate and the capacity return rate regardless of whether FEC is used alone or used together with EC.

Experiment 2

In the following experiment, the rare earth elements used were samarium and praseodymium.

Example 7

Batteries of Example 7 were manufactured in the same manner as in Example 3 except for using a positive-electrode active material prepared as follows. The active material was prepared in the same manner as in Example 1 except for containing 1.99 g of samarium nitrate hexahydrate instead of the erbium nitrate pentahydrate used in Example 1. The obtained positive-electrode active material was observed with the SEM to find that the positive-electrode active material had a samarium compound having an average particle size of 100 nm or less uniformly deposited on its surface. The amount of deposition of the samarium compound in the lithium cobalt oxide was 0.067% by mass in terms of samarium element.

Example 8

Batteries of Example 8 were manufactured in the same manner as in Example 7 except that the volume ratio of EC to FEC in the nonaqueous electrolytic solution was 50:50.

Example 9

Batteries of Example 9 were manufactured in the same manner as in Example 7 except that the volume ratio of EC to FEC in the nonaqueous electrolytic solution was 0:100.

Example 10

Batteries of Example 10 were manufactured in the same manner as in Example 3 except for using a positive-electrode active material prepared as follows. The active material was prepared in the same manner as in Example 1 except for containing 2.06 g of praseodymium nitrate hexahydrate instead of the erbium nitrate pentahydrate used in Example 1. The obtained positive-electrode active material was observed with the SEM to find that the active material had a praseodymium compound having an average particle size of 100 nm or less uniformly deposited on its surface. The amount of deposition of the praseodymium compound in the lithium cobalt oxide was 0.067% by mass in terms of praseodymium element.

Example 11

Batteries of Example 11 were manufactured in the same manner as in Example 10 except that the volume ratio of EC to FEC in the nonaqueous electrolytic solution was 50:50.

Example 12

Batteries of Example 12 were manufactured in the same manner as in Example 10 except that the volume ratio of EC to FEC in the nonaqueous electrolytic solution was 0:100.

Comparative Example 9

Batteries of Comparative Example 9 were manufactured in the same manner as in Example 7 except that the volume ratio of EC to FEC in the nonaqueous electrolytic solution was 100:0.

Comparative Example 10

Batteries of Comparative Example 10 were manufactured in the same manner as in Example 10 except that the volume ratio of EC to FEC in the nonaqueous electrolytic solution was 100:0.

[Evaluation of the Batteries]

The batteries manufactured in Examples 7 to 12 and Comparative Examples 9 and 10 were evaluated in the same manner as in Experiment 1. The obtained evaluation results are shown in Table 2 below. Furthermore, the capacity residual rate and the capacity return rate in Examples 7 to 12 and Comparative Examples 9 and 10 are shown in FIG. 3.

TABLE 2

| | Rare earth element compound | FEC ratio | Capacity residual rate (%) | Capacity return rate (%) | Growth rate of charge capacity (%) | Increase in thickness (mm) |
|---|---|---|---|---|---|---|
| Comparative Example 9 | Samarium | 0 | 83.2 | 81.9 | 129.1 | 0.2 |
| Example 7 | Samarium | 0.25 | 88.2 | 83.8 | 122.5 | 4.5 |
| Example 8 | Samarium | 0.5 | 87.1 | 82.3 | 121.0 | 4.7 |
| Example 9 | Samarium | 1 | 84.4 | 82.3 | 117.1 | 5.0 |
| Comparative Example 10 | Praseodymium | 0 | 83.1 | 80.0 | 127.1 | 0.4 |
| Example 10 | Praseodymium | 0.25 | 86.6 | 83.0 | 121.2 | 4.2 |
| Example 11 | Praseodymium | 0.5 | 83.2 | 80.2 | 114.2 | 4.1 |
| Example 12 | Praseodymium | 1 | 86.3 | 85.2 | 114.1 | 5.0 |

Figure 3:
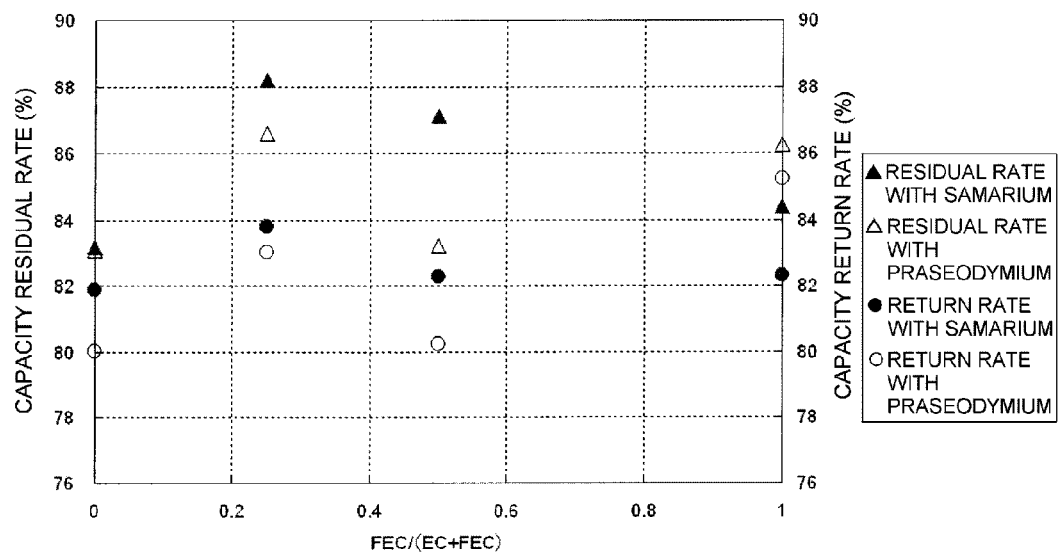
FIG. 3 shows the relation between the FEC ratio, the capacity residual rate, and the capacity return rate in other examples of the present invention.

As apparent from Table 2 and FIG. 3, the use of samarium or praseodymium as the rare earth element in the present invention can not only reduce decomposition of the EC at the positive electrode, but also reduce the reaction between the reductive decomposition product of the FEC at the negative electrode and the positive electrode. As a result, as shown in FIG. 3, the use of EC and FEC in mixture provides high capacity residual rate and high capacity return rate after the continuous charge. The use of samarium or praseodymium provides similar results to the use of erbium shown in Examples 1 to 6. This indicates that the effect of the present invention can also be obtained by dispersing erbium or other rare earth compounds on the surface of a positive-electrode active material.

<Evaluation of the Post-Storage Efficiency>

Post-storage efficiency was evaluated for Examples 1 to 6 and Comparative Examples 1, 7, and 8 manufactured in Experiment 1, and Examples 7 to 12 and Comparative Examples 9 to 10 manufactured in Experiment 2 based on the following formulas.

The post-storage efficiency (%)={the discharge capacity at the second cycle after the continuous charge test/the charge capacity at the first cycle after the continuous charge test}×100

The data of the post-storage efficiency is shown in Tables 3 and 4.

The post-storage efficiency means the charge-discharge cycle efficiency at the first cycle after the storage.

TABLE 3

| | Rare earth element compound | FEC ratio | post-storage efficiency (%) |
|---|---|---|---|
| Comparative Example 1 | Erbium | 0 | 96.2 |
| Example 1 | Erbium | 0.1 | 95.5 |
| Example 2 | Erbium | 0.2 | 99.0 |
| Example 3 | Erbium | 0.25 | 99.5 |
| Example 4 | Erbium | 0.5 | 100.8 |
| Example 5 | Erbium | 0.75 | 100.2 |
| Example 6 | Erbium | 1 | 101.3 |
| Comparative Example 7 | — | 0 | 82.5 |
| Comparative Example 8 | — | 1 | 93.4 |

TABLE 4

| | Rare earth element compound | FEC ratio | post-storage efficiency (%) |
|---|---|---|---|
| Comparative Example 9 | Samarium | 0 | 89.6 |
| Example 7 | Samarium | 0.25 | 99.3 |
| Example 8 | Samarium | 0.5 | 99.1 |
| Example 9 | Samarium | 1 | 100.6 |
| Comparative Example 10 | Praseodymium | 0 | 94.7 |
| Example 10 | Praseodymium | 0.25 | 99.3 |
| Example 11 | Praseodymium | 0.5 | 99.2 |
| Example 12 | Praseodymium | 1 | 100.8 |

As apparent from Tables 3 and 4, the post-storage efficiency is 99% or more when the FEC ratio is 0.2 or more. This indicates that the FEC ratio is preferably 0.2 or more.

What is claimed is:

1. A nonaqueous electrolyte secondary battery comprising:
   a positive electrode;
   a negative electrode; and
   a nonaqueous electrolytic solution,
   wherein:
   the nonaqueous electrolytic solution contains fluoroethylene carbonate as a solvent and the solvent further contains ethylene carbonate;
   the positive electrode contains a positive-electrode active material with fine particles of an oxyhydroxide or hydroxide of at least one element selected from the group consisting of erbium, praseodymium, neodymium, ytterbium, terbium, dysprosium, holmium, thulium, lutetium, and samarium, deposited on the surface thereof in a dispersed state; and
   the fine particles of the oxyhydroxide or hydroxide have an average particle size of not more than 100 nm.

2. The nonaqueous electrolyte secondary battery of claim 1, wherein:
   the volume ratio of the fluoroethylene carbonate (FEC) to the sum of the ethylene carbonate (EC) and the fluoroethylene carbonate (FEC) satisfies the relation of 0.2≤FEC/(EC+FEC).

3. The nonaqueous electrolyte secondary battery of claim 1, wherein:
   the positive-electrode active material is obtained by a method including a process of precipitating the oxyhydroxide or hydroxide on the surface of the positive-electrode active material dispersed in a solution.

4. The nonaqueous electrolyte secondary battery of claim 1,
   wherein the positive-electrode active material is a lithium-containing transition metal composite oxide with the fine particles deposited directly on the surface thereof.

5. A nonaqueous electrolyte secondary battery comprising:
   a positive electrode;
   a negative electrode; and
   a nonaqueous electrolytic solution, wherein:
   the nonaqueous electrolytic solution contains fluoroethylene carbonate as a solvent and the solvent further contains ethylene carbonate;
   the positive electrode contains a positive-electrode active material with fine particles of an oxyhydroxide or hydroxide of at least one element selected from the group consisting of erbium, praseodymium, neodymium, ytterbium, terbium, dysprosium, holmium, thulium, lutetium, and samarium, deposited on the surface of the positive-electrode active material in a dispersed state; and
   the volume ratio of the fluoroethylene carbonate (FEC) to the sum of the ethylene carbonate (EC) and the fluoroethylene carbonate (FEC) satisfies the relation of 0.2≤FEC/(EC+FEC).

6. The nonaqueous electrolyte secondary battery of claim 5, wherein:
   the oxyhydroxide or hydroxide is at least one oxyhydroxide or hydroxide selected from the group consisting of erbium, praseodymium, and samarium.

7. The nonaqueous electrolyte secondary battery of claim 5, wherein:
   the oxyhydroxide or hydroxide is an oxyhydroxide or hydroxide of erbium.

8. The nonaqueous electrolyte secondary battery of claim 5, wherein:
   a ratio of the ethylene carbonate (EC) and the fluoroethylene carbonate (FEC) to an entire volume of the solvent satisfies the relation of
   0<(EC+FEC)/the entire volume of the solvent<0.6.

9. The nonaqueous electrolyte secondary battery of claim 5, wherein:
   a ratio of the ethylene carbonate (EC) and the fluoroethylene carbonate (FEC) to an entire volume of the solvent satisfies the relation of
   0.2<(EC+FEC)/the entire volume of the solvent<0.5.

10. The nonaqueous electrolyte secondary battery of claim 6, wherein:
    a ratio of the ethylene carbonate (EC) and the fluoroethylene carbonate (FEC) to an entire volume of the solvent satisfies the relation of
    0.2<(EC+FEC)/the entire volume of the solvent<0.5.

11. The nonaqueous electrolyte secondary battery of claim 7, wherein:
    a ratio of the ethylene carbonate (EC) and the fluoroethylene carbonate (FEC) to an entire volume of the solvent satisfies the relation of
    0.2<(EC+FEC)/the entire volume of the solvent<0.5.

* * * * *